INVENTORS
DWIGHT W. PARKEN
BY RICHARD D. PHILIPSEN

ATTORNEYS

United States Patent Office 3,165,390
Patented Jan. 12, 1965

3,165,390
DUST EJECTOR FOR AIR CLEANERS
Dwight. W. Parken, Washington, and Richard D. Philipsen, Peoria, Ill., assignors to Caterpillar Tractor Co., Peoria, Ill., a corporation of California
Filed Mar. 26, 1962, Ser. No. 182,192
2 Claims. (Cl. 55—431)

This invention relates to a dust ejector for air cleaners and more particularly relates to a dust ejector for continuously removing contaminants from air cleaners adapted for use with internal combustion engines.

The problem of internal combustion engine clogging is particularly apparent when such an engine must be operated in a dusty or otherwise contaminated environment. During such operations, it often becomes necessary for the operator of such an engine to make as many as three or four stops a day in order to remove and check whether the dust cup of the air cleaner should be emptied. Even with such a removal procedure a continuous and efficient engine operation is not always assured, particularly where reduced air flow to the engine is encountered when the dust cup is filled.

Many attempts have been made to cope with the problem of efficiently and continuously ejecting such contaminants from the above mentioned type of air cleaner. Such attempts, for the most part, have comprised devices employing the use of power driven pumps and the like for the ejection of such contaminants. Such devices generally involve considerable expense and a system which is prone to mechanical failure, primarily due to the utilization of moving parts therein.

The present invention has overcome many of the above-mentioned difficulties by providing a dust ejector void of moving parts which is connected to an exhaust manifold of an engine at one end thereof to receive exhaust gases therefrom and which provides jet pump means arranged in an air cleaner of the engine for creating a relatively low pressure region therein to draw surrounding contaminants into the dust ejector and eject them exteriorly of the air cleaner.

An object of this invention is to provide an efficient and low cost means for removing contaminants from an air cleaner.

A further object of this invention is to provide a dust ejector for air cleaners which has no moving parts, is relatively low in cost, durable in construction and efficient in operation.

Figure 1:
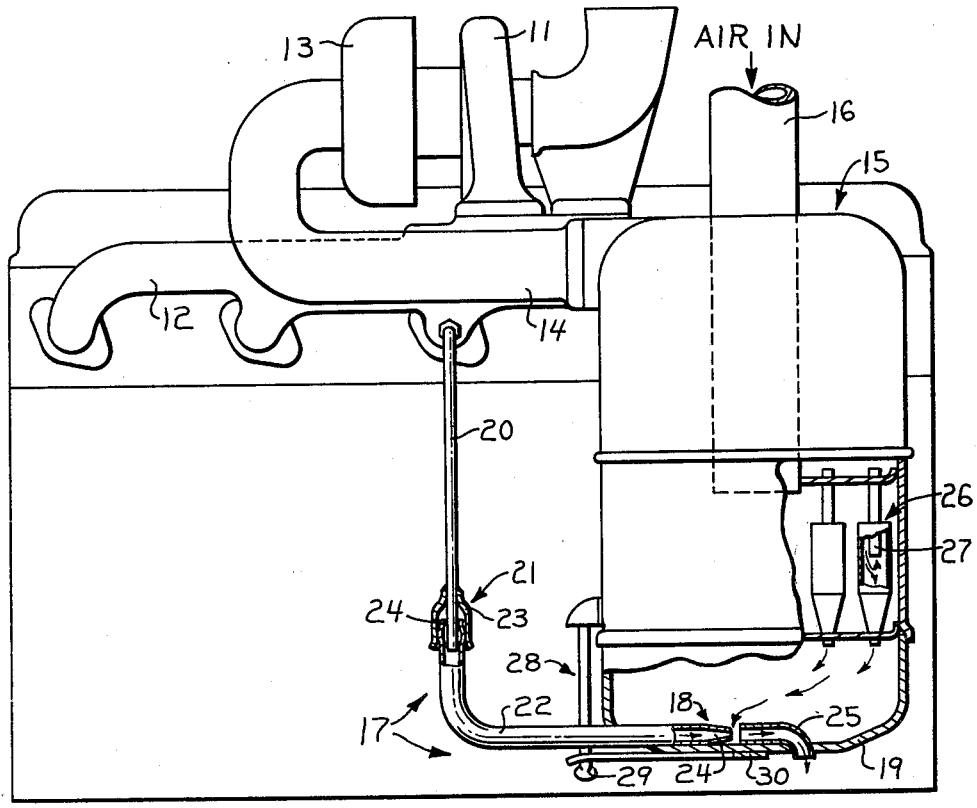
Figure 2:
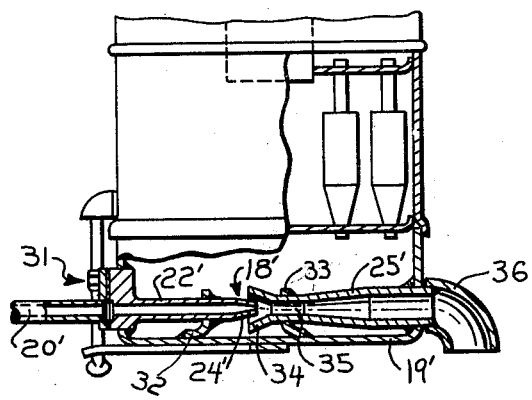

These and other objects of this invention will become apparent from the following description taken in connection with the accompanying drawings, in which:

FIG. 1 is a partially sectioned, elevational view disclosing a dust ejector embodiment of this invention in combination with an internal combustion engine and air cleaner; and FIG. 2 is a partially sectioned, elevational view disclosing an alternative dust ejector embodiment, per se.

FIG. 1 discloses a conventional combustion engine 10 having a turbocharger with a turbine 11 for receiving actuating pressure from exhaust manifold 12 and arranged to drive a compressor 13 in the conventional manner. The compressor receives relatively clean air through a manifold 14 which is connected for this purpose to an air cleaner 15. The air discharged from the compressor is then fed through an intake manifold (not shown) to the engine in the well known manner.

As illustrated, contaminated ambient air is induced into the air cleaner 15 through an air intake pipe 16. In order to remove the heavier of contaminants therefrom, a dust ejector, generally shown at 17, is provided with jet pump means at 18 arranged in a dust cup 19 of the air cleaner for this purpose.

The dust ejector 17 comprises a first conduit 20 attached for communication with the exhaust manifold 12 of the engine. A coupling means 21 detachably connects conduit 20 to a second conduit 22. The coupling means may comprise a resilient, bell-shaped member 23 which is detachably associated with an expanded portion 24 of conduit 22.

The conduit 22 is constructed and arranged to extend into dust cup 19 and terminates therein in a jet nozzle portion 24. The jet nozzle is arranged in juxtaposed, communicating relationship to a third conduit 25 to thus form the jet pump means at 18. Pursuant to standard engineering design techniques, the jet pump means may be constructed and arranged to create a low pressure region therearound, relative to the major portions of the dust cup chamber, to thus induce the flow of the heavier contaminants thereto. The conduit 25 is preferably further arranged to extend through the dust cup and thus exteriorly of the air cleaner to expel such contaminants.

With the above described FIG. 1 construction and arrangement, it becomes obvious that an efficient and continuously operating means which is void of moving parts is provided for ejecting contaminants exteriorly of the air cleaner. As hereinbefore briefly stated, the contaminated air may be brought into the air cleaner by means of pipe 16. Such contaminated air is induced into the air cleaner by the reduced pressures occurring therein, as is well known in the art.

The contaminated air then proceeds to flow through a plurality of standard primary air-dust separators 26 with the relatively heavier contaminants or dust particles dropping therethrough into the chamber formed by the dust cup. The relatively dust free and thus, lighter air rises through outlet tubes 27 thereof and through standard air filters (not shown) in order to be further cleaned. The jet pump means 18 functions to draw such heavier contaminants into conduit 25 wherefrom they are discharged exteriorly of the air cleaner.

The dust cup and dust ejector assembly are removable from the air cleaner by means, including latching mechanisms, one of which is shown at 28. The latching mechanisms may comprise a pivotal latch member 29 which is adapted for attaching engagement with the bifurcated end portion of a resilient finger member 30 to thus permit a separation of the dust cup. As above described, the coupling means 21 permits a separation of conduits 20 and 22 to thus complete the procedure.

FIG. 2 discloses a view of a second embodiment of this invention. The numbered parts shown in FIG. 2 substantially correspond to those with like numbers occurring in FIG. 1. A first conduit 20' is operatively connected to a second conduit 22' by means of a standard coupling 31. The second and third conduits 22' and 25' are preferably supported by means of apertured bracket members 32 and 33, respectively.

The third conduit 25' comprises a conically shaped portion 34 which is preferably constructed and arranged in surrounding relationship to the extremity of jet nozzle portion 24'. A venturi passage 35 is formed in conduit 25' which functions to further speed up the exiting exhaust gas-contaminant flow in much the same manner as hereinbefore explained in connection with the corresponding structure shown in FIG. 1. The conduit 25' may be further provided with an extension 36 for discharging the contaminants in a downwardly direction, exteriorly of the air cleaner.

We claim:
1. In combination with an air cleaner having a contaminant separation chamber and a dust cup vertically arranged beneath said contaminant separation chamber and detachably mounted thereto by latching means, said dust cup including vertical side walls and a horizontal bottom wall; a dust ejector comprising a first conduit extending from outside said dust cup horizontally through said side wall and adjacent said bottom wall, the portion of said conduit outside said side wall terminating in a coupling adapted for detachable connection to a gas line, said conduit terminating inside said dust cup in a restricted nozzle portion; a second conduit extending from inside dust cup to outside thereof, the portion of said second conduit inside said cup being in axial alignment with said first conduit, said second conduit terminating inside said cup in closely spaced relation to said nozzle portion, whereby when gas under pressure is directed into said first conduit a low pressure region is created between said nozzle portion and the inside terminal of said second conduit means with any dust in said dust cup flowing into said low pressure region and through said second conduit to outside said dust cup and whereby the dust cup and the ejector may be removed from the air cleaner by the detachable coupling and latch means.

2. The combination according to claim 1, wherein said second conduit terminates inside said dust cup with a frusto-conical end portion and a restricted portion forming a venturi throat, said frusto-conical portion being in surrounding relationship to said nozzle portion of said first conduit.

References Cited in the file of this patent
UNITED STATES PATENTS

| | | |
|---|---|---|
| 1,591,677 | Garner | July 6, 1926 |
| 1,745,950 | Orem | Feb. 4, 1930 |
| 2,392,872 | Wolfe | Jan. 15, 1946 |
| 2,409,211 | Kalle | Oct. 15, 1946 |
| 2,825,317 | Tacchella et al. | Mar. 4, 1958 |
| 2,943,698 | Bishop | July 5, 1960 |